T. SAKATA,
M. NAKABAYASHI,
H. YOSHIVARI:
INVENTORS

United States Patent Office 3,495,412
Patented Feb. 17, 1970

3,495,412
PROCESS FOR STABILIZING SOIL
Tenji Sakata and Miwaki Nakabayashi, Suita-shi, and Hideji Yoshinari, Osaka-fu, Japan, assignors to Sekisui Kagaku Kogyo Kabushiki Kaisha, Osaka, Japan
Filed July 31, 1967, Ser. No. 657,395
Int. Cl. E02d 3/12; E02b 1/00; E21b 33/13
U.S. Cl. 61—36    11 Claims

ABSTRACT OF THE DISCLOSURE

A process for forming a gel-like material in a soil by injecting into the soil an aqueous solution comprising three components of urea, formaldehyde and polyvinyl alcohol and thereafter curing the aqueous solution with an acidic substance, which process is useful for rendering a water-permeable soil water-impermeable and thereby stabilizing it.

---

This invention relates to a process which comprises injecting a chemical grout into a water-permeable soil and curing the chemical grout after it has permeated the soil, thereby binding the soil particles and making the soil water-impermeable. The concretion of instable grounds or foundations or rendering the same water-impermeable is especially required in the fields of civil engineering, construction and mining. For example, it is necessary in connection with such as reinforcement of the foundation of buildings and prevention of cave-ins and leakage of water during underground construction work.

As this method, heretofore such a stabilization of soil with cement was practiced mainly, but there was the drawback that the cement particles, being subjected to a filtration action in the ground, was inferior as to its permeability and did not permeate the minute interstices of the soil, with the consequence that the scope in which it could be used was restricted.

Lately, a chemical soil stabilizing process which uses polymeric materials, i.e., a process in which the soil is cured by the injection thereinto of a chemical grout, is becoming prevalent. A great number of polymeric materials to be used as this chemical grout have been proposed, but none are satisfactory, since in all cases they had shortcomings such as high cost, high viscosity, prolonged curing time, poor strength or lack of durability.

On the other hand, there is also known a process in which as the chemical grout is used the urea-formaldehyde resin, which not only is inexpensive and has a low viscosity but also has a short curing time. Although this process is being effectively used, it has the drawback that not only it is unable to render the soil fully water-impermeable but also the strength of the so cured soil is not fully adequate unless a great quantity of resin is used.

An object of this invention is to provide a process which firmly binds a water-permeable, instable soil and renders it water-impermeable.

Another object of this invention is to provide a process for stabilizing soil in which the curing time of the chemical grout can be varied ranging from a short to a long period of time.

A further object of this invention is to provide a process for stabilizing soil in which is used a chemical grout which can readily permeate the soil and the practice of which is very readily carried out.

A still another object of this invention is to provide a low-cost process for stabilizing soil.

Other objects and effects of the invention will become apparent from the following description.

The foregoing objects are achieved by a process which comprises injecting into a water-permeable soil and aqueous solution comprising urea, formaldehyde, and polyvinyl alcohol, and thereafter curing the same with an acidic substance.

Figure 1:
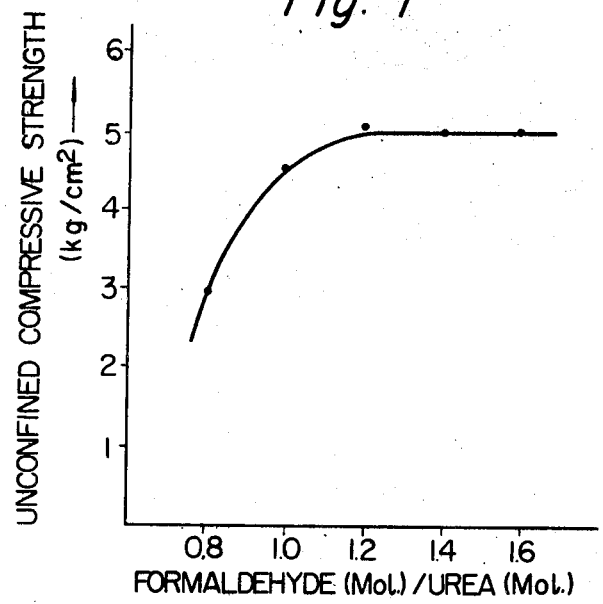
FIG. 1 is a graphic representation of the unconfined compressive strength obtained by the application of a urea formaldehyde ratio 1:0.8–1:1.5.

As the aqueous solution comprising urea, formaldehyde, and polyvinyl alcohol, any of the following can be also conveniently used; namely, an aqueous solution of a reaction product obtained by reacting in advance in a pH range of 6–11 an aqueous solution of urea, formaldehyde and polyvinyl alcohol; an aqueous solution of a nonresinous urea-formaldehyde condensation product containing formaldehyde, urea and polyvinyl alcohol; or an aqueous solution of a reaction product obtained by reacting in advance within the pH range of 6–11 an aqueous solution of a nonresinous urea-formaldehyde condensation product containing formaldehyde, urea and polyvinyl alcohol.

Accordingly, the term "aqueous solution" used in the present specification means the above-mentioned four aqueous solutions.

The urea to be used in this invention may be of any class, including those which are commercially available.

As the formaldehyde, formalin and paraformaldehyde can be used, but formalin is convenient from the operational standpoint.

When a nonresinous urea-formaldehyde condensation product containing formaldehyde is used in this invention, one is used in which the urea and formaldehyde have been reacted to an extent that the water-solubility of the nonresinous condensation product containing formaldehyde has not been lost. This nonresinous urea-formaldehyde condensation product containing formaldehyde to be used in this invention is usually preferably one in which the reaction has been carried out in a proportion of one mole of urea to 2–5 moles of formaldehyde. Since the storage stability of a nonresinous condensation product obtained by reacting urea and formaldehyde in a ratio of one mole of the former to less than 2 moles of the latter is unsatisfactory, such a product is undesirable for use in this invention. Thus, since an excess of formaldehyde is used to the urea in this invention, the nonresinous urea-formaldehyde condensation product used in this invention contains therein unreacted formaldehyde.

The most usual method of preparing this nonresinous urea-formaldehyde condensation product containing formaldehyde, which is conveniently used in this invention, is to react urea and formaldehyde in a ratio of 1 mole of the former to 2–5 moles of the latter, for one hour at a temperature of above 70° C. at a pH of 7.0–8.5, then for 5 hours at a temperature of above 70° C. at a pH of 4.5–5.5, followed by neutralization.

This nonresinous condensation product may be modified with an alcohol such as ethylene glycol, methanol and the like, or acetone, thiourea or phenol.

As the polyvinyl alcohol to be used in this invention, conveniently used are those which are water-soluble, have a degree of polymerization of 300–2400, and have a composition of 65–99 mol percent of vinyl alcohol, 0–35 mol percent of vinyl acetal and 1–35 mol percent of vinyl acetate. The higher the degree of polymerization or lower content of vinyl alcohol of this polyvinyl alcohol, the more effective is it in small amounts for stabilizing soil, but if the content of vinyl alcohol becomes lower than 65 mole percent, it cannot be used, for it loses its water solubility. Further, the polyvinyl alcohol which has been partially acetalized can also be used. As such acetalized products, those which have been acetalized by means of the aldehydes such as formaldehyde, acetaldehyde and glyoxal are suitable. However, those whose content of vinylacetal is greater than 35 mol percent cannot be used in this invention, since their water solubility is lost. So long as they are within the above-indicated ranges, a wide variety of the polyvinyl alcohols may be used mixed.

Of the aqueous solution comprising urea, formaldehyde, and polyvinyl alcohol, those which can be used especially conveniently in this invention are those in which the proportion of the components come within the following range: on a basis of 100 parts by weight of the aqueous solution, 1–30 parts by weight of urea, 0.4–22.5 parts by weight of formaldehyde (1.1–61 parts by weight as 37% formalin), 0.1–4.0 parts by weight of polyvinyl alcohol and the remainder water. Even in the case a nonresinous urea-formaldehyde condensation product containing formaldehyde is to be used, the total urea and total formaldehyde in the aqueous solution are suitably within the foregoing range, and it is particularly preferred that the nonresinous urea-formaldehyde condensation product containing formaldehyde be used in a range of 1.3–16.5 parts by weight to 100 parts by weight of the aqueous solution.

Figure 2:
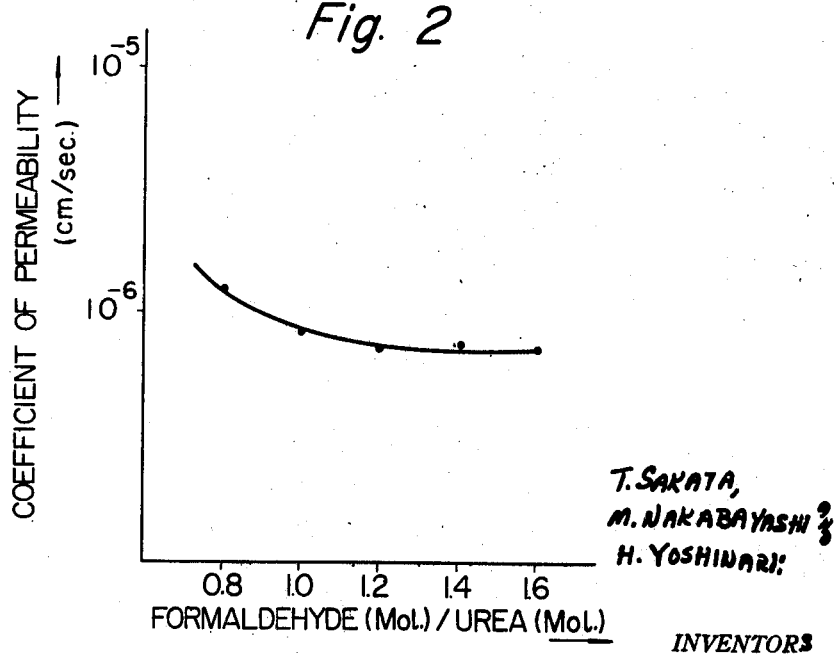
FIG. 2 is a graphic representation of the coefficient of permeability of the composition of FIGURE 1.

As to the proportion of the total amount of urea to the total amount of formaldehyde to be used in this invention, a mole ratio ranging between 1:08 and 1:15 is particularly suitable. This is because the soil cannot be fully stabilized when the proportion of the total formaldehyde to the total urea is a ratio of below 0.8 mole of the former to one mole of the latter, and hence a firm soil does not result whereas, on the other hand, when the proportion of the total formaldehyde to the total urea is a ratio of above 1.5 moles of the former to one mole of the latter, the stabilized soil is imparted a pungent odor, which is very offensive when the soil is dug. Moreover, even though the proportion of the formaldehyde to the urea exceeds the mole ratio 1.5:1, the effects such as the strength and water-stopping property of the stabilized soil are not improved at all. It is also apparent from FIGS. 1 and 2 that satisfactory results are had when proportion used of the urea to formaldehyde is a ratio 1:0.8–1:1.5. FIGS. 1 and 2 are graphic representations of the results obtained in the hereinafter given Examples 11–15. Along the vertical axis of FIG. 1 is indicated the unconfined compressive strength (kg./cm.$^2$) of the stabilized soil, while along the horizontal axis is indicated the mole ratio of the formaldehyde to urea. Along the vertical axis of FIG. 2 is indicated the coefficient of permeability (cm./sec.) of the stabilized soil, while along the horizontal axis is indicated the mole ratio of formaldehyde to urea. And the vertical axis in FIG. 2 shows a logarithm.

On the other hand, as regards the amount of polyvinyl alcohol, when this is used in an amount more than 4 parts by weight per 100 parts by weight of the aqueous solution, the viscosity of the aqueous solution rises, with the consequence that it becomes impossible for the aqueous solution to permeate the soil thoroughly, whereas when the amount of polyvinyl alcohol is less than 0.1 part by weight, it is not sufficient for rendering the soil water-impermeable.

When a nonresinous urea-formaldehyde condensation product containing formaldehyde is used in this invention, there is the advantage that the water stopping property of the stabilized soil is excellent.

According to this invention, the aqueous solution of urea, formaldehyde and polyvinyl alcohol or the aqueous solution of a nonresinous urea-formaldehyde condensation product containing formaldehyde, urea and polyvinyl alcohol may be introduced into the soil after having reacted the solution somewhat. And this reaction may be carried out at a pH ranging between 6 and 11 and at a temperature below 50° C., usually ordinary temperature. Since the viscosity of this aqueous solution of a reaction product rises when it is stored for a prolonged period of time, it is preferably used within 15 days at ordinary temperature. In general, it is best to carry out the reaction of the aqueous solution in the neighborhood of the site where the injection is to be made into the soil and to use it immediately. When this aqueous solution of a reaction product is used there is the advantage that the time from the contact of the aqueous solution with an acid substance to the completion of its cure is shortened. Hence, it is particularly effective in those cases where the soil is to be stabilized in a short period of time. Moreover, when this aqueous solution of a reaction product is used there is advantage that the unconfined compressive strength and the coefficient of permeability of stabilized soil is especially excellent.

According to one embodiment of this invention, the aqueous solution of urea, formaldehyde, and polyvinyl alcohol is injected into the soil and then the curing is carried out by means of an acidic substance. This acidic substance acts as a condensation catalyst of the urea and formaldehyde. Suitable acidic substances include the inorganic acids such as sulfuric, hydrochloric, phosphoric acids, the organic acids such as oxalic, acetic and formic acids, the ammonium salts of strong acids, such as ammonium chloride and ammonium sulfate, and the acid salts such as sodium bisulfate and potassium bisulfate. This acidic substance is used in such a manner that there pH become less than 5.0. While this acidic substance may be mixed with the aforesaid aqueous solution immediately prior to the injection of the latter into the soil to be injected as a mixture therewith, it also may be injected into the soil separately from said aqueous solution.

The aqueous solution comprising urea, formaldehyde, and polyvinyl alcohol must permeate the interstices of the soil uniformly. Its permeability is influenced by the viscosity of the aqueous solution. Although the suitable viscosity range of the aqueous solution will vary depending upon the characteristics of the soil, normally it is 1–15 centipoises and preferably 1–5 centipoises.

The amount of the aqueous solution to be injected into the soil to be stabilized will vary over a broad range depending upon the characteristics of the soil, but in general it is 0.5–100 parts by weight per 100 parts by weight of the soil.

Of the components, urea, formaldehyde, and polyvinyl alcohol which make up the aqueous solution of this invention, not even one can be missing. Namely, when either urea or formaldehyde is not used, the curing does not take place, while in the case polyvinyl alcohol is not used, the strength of the stabilized soil becomes inadequate and moreover the water-stopping property becomes very unsatisfactory.

As the aqueous solution comprising urea, formaldehyde and polyvinyl alcohol, either an aqueous solution of a nonresinous urea-formaldehyde condensation product containing formaldehyde, urea and polyvinyl alcohol or an aqueous solution of reaction product obtained by re-acting the aforesaid aqueous solution slightly may be used in this invention. In these cases if urea is not added, the stabilized soil has a ungent odor of formaldehyde, since the nonresinous condensation product in this invention contains unreacted formaldehyde. This pungent odor is very offensive during digging operations and the like, and moreover the control of curing time becomes difficult. When a process using an aqueous solution of nonresinous urea-formaldehyde condensation product containing formaldehyde, urea and polyvinyl alcohol in this invention is compared with a process using an aqueous solution of nonresinous urea-formaldehyde condensation product containing formaldehyde and polyvinyl alcohol having no urea with the total urea contents in both aqueous solutions being equal, the former is more excellent than the latter in the strength of stabilized soil. This fact is apparent from FIG. 3. The graph shown in FIG. 3 has been prepared from the results obtained in the hereinafter given Examples 26–30, the unconfined compressive strength (kg./cm.$^2$) of the stabilized soil being indicated along the vertical axis and the weight percent of total urea in the aqueous solution being indicated along the horizontal axis. The solid line C is the instance where the aqueous solution comprising a nonresinous urea-formaldehyde condensation product containing formaldehyde, urea and polyvinyl alcohol was used, whereas the dotted line D is the instance where the aqueous solution comprising the nonresinous urea-formaldehyde condensation product containing formaldehyde and polyvinyl alcohol was used. The points A and B indicate respectively the points where the urea and formaldehyde in mole ratio are 1:1.5 and 1:0.8.

In view of the fact that the process of this invention uses particularly the urea-formaldehyde resin from among the synthetic resins, it is economical and the strength of the stabilized soil becomes adequate.

Further, since polyvinyl alcohol is used, the water-stopping property becomes adequate.

Figure 4:
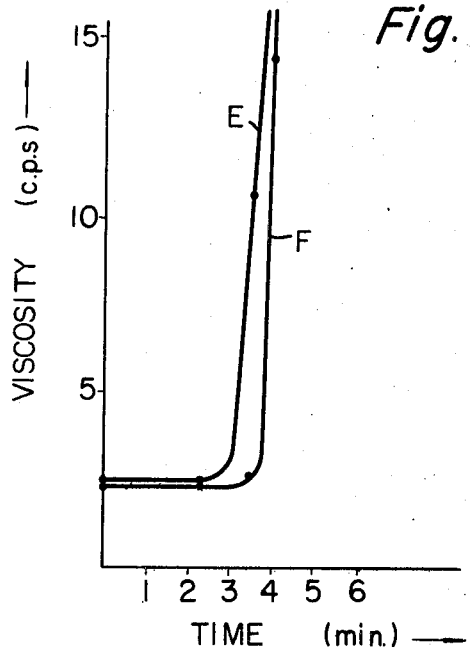
FIG. 4 is a graphic representation of the results obtained in terms of viscosity and time.

As is apparent from FIG. 4 which represents the results obtained in the hereinafter given Examples 37 and 38, the aqueous solution as used in this invention permeates the soil readily, and moreover its curing takes place promptly after the permeation. In FIG. 4, the viscosity (centipoise) is indicated along the vertical axis, while the time (minute) is indicated along the horizontal axis. The curve E represents the instance where the aqueous solution of a nonresinous urea-formaldehyde condensation product containing formaldehyde, urea and polyvinyl alcohol of the invention process was used, whereas the curve F represents the instance where an aqueous solution of urea, formaldehyde and polyvinyl alcohol of the invention process was used. From FIG. 4 it can be seen that the aqueous solution used in this invention demonstrates a rise in viscosity with the passage of time and that it has the remarkable property of maintaining a viscosity which permits its ready permeation into the interstices of the soil up to the time immediately prior to its curing when injected into the soil, following which it is promptly cured.

In the case of the soil stabilization process of this invention, the time which elapses from the injection of the aqueous solution and acidic substance into the soil to the completion of the cure is short. Further, the cure is accomplished in a short period of time in the case where either an aqueous solution of urea, formaldehyde and polyvinyl alcohol or an aqueous solution of a nonresinous urea-formaldehyde condensation product containing formaldehyde, urea and polyvinyl alcohol is reacted and an aqueous solution of the reaction product thereof is used.

Again, according to this invention, the time required for the curing can be adjusted by varying the amount of urea used, the time being shortened by increasing the amount of urea.

The soil stabilized by means of the invention process has permanent durability, excels in resistance to water, oil and attack by chemicals, and has a good dimensional stability.

The following illustrative examples are given. The parts are on a weight basis, and the preparation of the specimens and determination of the unconfined compressive strength and coefficient of permeability were performed at 15° C.

EXAMPLES 1–5

Nine parts of 37% formalin, 6 parts of urea, and 1 part of polyvinyl alcohol (degree of polymerization of 2000, having 80 mol percent of vinyl alcohol and 20 mol percent of vinyl acetate) were dissolved in water and an aqueous solution of a total quantity of 50 parts was prepared. Further, similar aqueous solutions were adjusted to an initial pH of 7.8 and reacted at 50° C. By varying the reaction time, four classes of aqueous solutions of reaction products, each in an amount of 50 parts, were obtained.

51.5 parts of 3 wt. percent aqueous sodium bisulfate solution were added to each of the aqueous solution and the four classes of aqueous solutions of reaction products, obtained as hereinabove described, to adjust a total quantity of each of the solutions to 101.5 parts. The curing time was then measured at 15° C. Further, 101.5 parts each of the aforesaid five classes of aqueous solutions were each mixed with 300 parts of Toyoura standard cement-testing sand, following which the mixtures were tamped in a cylindrical frame 50 mm. in diameter and 100 mm. high so as to obtain a porosity of 39%. After allowing these specimens to stand in wet sand for 3 days, the unconfined compressive strength and coefficient of permeability of each of the solidified sands were measured.

The results are shown in Table I.

TABLE I

| Example | Reaction time (min.) | Curing time (min.) | Unconfined compressive strength (kg./cm.$^2$) | Coefficient of permeability (cm./sec.) |
| --- | --- | --- | --- | --- |
| 1 | 0 | 8.0 | 6.7 | 5.6×10$^{-7}$ |
| 2 | 60 | 3.5 | 8.3 | 2.0×10$^{-7}$ |
| 3 | 120 | 2.0 | 9.3 | 1.1×10$^{-7}$ |
| 4 | 180 | 1.7 | 10.4 | 8.5×10$^{-8}$ |
| 5 | 240 | 1.7 | 10.4 | 8.6×10$^{-8}$ |

EXAMPLES 6–10

4.5 parts of 37% formalin, 3 parts of urea and 1 part of polyvinyl alcohol (degree of polymerization of 2000, having 80 mol percent of vinyl alcohol and 20 mol percent of vinyl acetate) were dissolved in water and an aqueous solution of a total quantity of 50 parts was prepared. Similar aqueous solutions were adjusted to an initial pH 10.5 with sodium hydroxide and reacted at 15° C. By varying the reaction time, four classes of aqueous solutions of the reaction products, each in an amount of 50 parts, were obtained.

53 parts of 6 wt. percent aqueous oxalic acid solution were added to each of the aqueous solution and the four classes of aqueous solutions of the reaction products, obtained as hereinabove described, to adjust a total quantity of each of the solution to 103 parts. The curing time was then measured at 15° C. Further, as in Examples 1–5, Toyoura standard sand was cured by means of the aforesaid five classes of aqueous solutions, and the unconfined compressive strength and coefficient of permeability thereof were measured. The results are shown in Table II.

TABLE II

| Example | Reaction time (min.) | Curing time (min.) | Unconfined compressive strength (kg./cm.$^2$) | Coefficient of permeability (cm./sec.) |
| --- | --- | --- | --- | --- |
| 6 | 0 | 7.7 | 4.8 | 7.0×10$^{-7}$ |
| 7 | 60 | 5.0 | 5.7 | 6.5×10$^{-7}$ |
| 8 | 120 | 3.3 | 6.5 | 4.2×10$^{-7}$ |
| 9 | 180 | 2.3 | 7.2 | 1.2×10$^{-7}$ |
| 10 | 240 | 1.8 | 7.5 | 1.0×10$^{-7}$ |

EXAMPLES 11–15

Three parts of urea, 1 part of polyvinyl alcohol (degree of polymerization of 2000, having 80 mol percent of vinyl alcohol and 20 mol percent of vinyl acetate) and formaldehyde in various amounts indicated in the following Table III were added to 20 parts of water and dissolved therein, followed by the further addition of water to adjust a total quantity of each solution to 50 parts, thereby preparing aqueous solution containing formaldehyde in various amounts. 52 parts of 4 wt. percent aqueous sodium bisulfate solution were added to each of these aqueous solutions, adjusting a total quantity of each solution to 102 parts. Each of these solutions were mixed with 300 parts of Toyoura standard sand and the mixtures were each placed in a cylindrical frame 50 mm. in diameter and 100 mm. high and tamped so as to obtain a porosity of 39%. After allowing the specimens to stand for 3 days in water, the unconfined compressive strength and coefficient of permeability of the solidified sands were measured. The results are shown in Table III.

TABLE III

| | Amount of formaldehyde (part) | Formaldehyde/Urea (mol) | Unconfined compressive strength (kg./cm.$^2$) | Coefficient of permeability (cm./sec.) |
|---|---|---|---|---|
| 11 | 1.2 | 0.8 | 3.0 | $1.3 \times 10^{-6}$ |
| 12 | 1.5 | 1.0 | 4.6 | $7.8 \times 10^{-7}$ |
| 13 | 1.8 | 1.2 | 5.1 | $7.0 \times 10^{-7}$ |
| 14 | 2.1 | 1.4 | 5.0 | $7.2 \times 10^{-7}$ |
| 15 | 2.4 | 1.6 | 5.0 | $7.1 \times 10^{-7}$ |

The results obtained in Table III are as shown in FIGS. 1 and 2. In FIG. 1, the unconfined compressive strength (kg./cm.$^2$) is indicated along the vertical axis, while the mole ratio of formaldehyde to urea is indicated along the horizontal axis. On the other hand, in FIG. 2, the coefficient of permeability (cm./sec.) is indicated along the vertical axis, while the mole ratio of formaldehyde to urea is indicated along the horizontal axis. And the vertical axis in FIG. 2 is shown a logarithm.

EXAMPLES 16–19

Sixty parts of urea were dissolved in 200 parts of 37% formalin, and after adjusting the pH of the solution to 8.0, it was reacted for one hour at 85° C. After adjusting the pH of the reaction mixture to 4.7 with a formic acid, it was reacted for 3 hours, after which the reaction mixture was neutralized to a pH of 7.5 to obtain an aqueous solution of a nonresinous urea-formaldehyde condensation product containing formaldehyde.

To 20 parts each of the so obtained aqueous solution of nonresinous condensation product containing formaldehyde were added 5 parts of urea and a 15 wt. percent aqueous solution of polyvinyl alcohol (degree of polymerization of 2000, having 80 mol percent of vinyl alcohol and 20 mol percent of vinyl acetate) in the amounts indicated in the following Table IV, followed by adding water to adjust a total quantity of each to 100 parts, thereby obtaining the aqueous solutions. Each of these aqueous solutions, after adding 6 parts of 25 wt. percent aqueous sodium bisulfate solution, was mixed with 250 parts of Toyoura standard sand, after which each of the mixtures was placed in a cylindrical frame 50 mm. in diameter and 100 mm. high and tamped so as to obtain a porosity of 40%. After allowing the so solidified sands to stand for 4 days in water, the respective coefficient of permeability were measured. The results obtained are shown in Table IV.

TABLE IV

| Example | Amount of 15 wt. percent aqueous polyvinyl alcohol solution added (part) | Coefficient of permeability (cm./sec.) |
|---|---|---|
| 16 | 1.4 | $4 \times 10^{-6}$ |
| 17 | 3.0 | $7 \times 10^{-7}$ |
| 18 | 6.0 | $1 \times 10^{-8}$ |
| 19 | 14.0 | $3 \times 10^{-8}$ |
| Control | 0 | $5 \times 10^{-3}$ |

EXAMPLES 20–25

To 20 parts each of the aqueous solution of the nonresinous urea-formaldehyde condensation product containing formaldehyde obtained in Examples 16–19 were added 5 parts of urea, 70 parts of water and 6 parts of the 15 wt. percent aqueous polyvinyl alcohol (having no vinyl acetal) solution indicated in Table V, below, followed by further addition of 6 parts of 25 wt. percent aqueous sodium bisulfate solution. Each of these solution was mixed with 250 parts of Toyoura standard sand, after which each mixture was placed in a cylindrical frame 50 mm. in diameter and 100 mm. high and tamped so as to obtain a porosity of 40%. After allowing the so solidified sand to stand in water for 4 days, they were measured for their coefficient of permeability. The results obtained are shown in Table V.

TABLE V

| Example | Class of polyvinyl alcohol | | Coefficient of permeability (cm./sec.) |
|---|---|---|---|
| | D.P.[1] | C.V.[2], mol percent | |
| 20 | 1,400 | 98.5 | $1 \times 10^{-5}$ |
| 21 | 1,700 | 98.5 | $6 \times 10^{-6}$ |
| 22 | 500 | 88 | $1 \times 10^{-5}$ |
| 23 | 1,400 | 88 | $7 \times 10^{-7}$ |
| 24 | 1,700 | 88 | $4 \times 10^{-7}$ |
| 25 | 2,000 | 80 | $1 \times 10^{-7}$ |

[1] Degree of polymerization. [2] Content of vinyl alcohol.

EXAMPLES 26–30

To 15 parts of the aqueous solution of the nonresinous urea-formaldehyde condensation product containing formaldehyde obtained in Examples 16–19 were added 4 parts of a 15 wt. percent aqueous solution of polyvinyl alcohol (degree of polymerization of 2000, having 80 mol percent of vinyl alcohol and 20 mol percent of vinyl acetate). Urea in various amounts indicated in the following Table VI was added to these solutions after which water was added to adjust a total quantity of each solution to 100 parts. Then after adding 3 parts of sodium bisulfate, 100 parts of these solution were mixed with 250 parts of Toyoura standard sand, following which the mixtures, after being placed into a cylindrical frame 50 mm. in diameter and 100 mm. high, where taped so as to obtain a porosity of 36%. After allowing the so solidified sands to stand in water for 4 days, the unconfined compressive strength were measured. The results obtained are shown in Table VI.

TABLE VI

| Example | Amount of urea added (part) | Amount of total urea in aqueous solution (wt. percent) | Unconfined compressive strength (kg./cm.$^2$) |
|---|---|---|---|
| 26 | 2.5 | 6.0 | 5.6 |
| 27 | 3.5 | 7.0 | 6.9 |
| 28 | 4.5 | 8.0 | 7.1 |
| 29 | 5.5 | 9.0 | 6.8 |
| 30 | 6.5 | 10.0 | 6.0 |

On the other hand, to 4 parts of a 15 wt. percent aqueous solution of polyvinyl alcohol (degree of polymerization of 2000, having 80 mol percent vinyl alcohol and 20 mol percent of vinyl acetate) were added aqueous solution of nonresinous urea-formaldehyde condensation product containing formaldehyde obtained in Examples 16–19, in various amounts indicated in the following Table VII. Subsequently, water was added to these aqueous solutions to adjust a total quantity of each solution to 100 parts. Then after adding 3 parts of sodium bisulfate, 100 parts of these solution were mixed with 250 parts of Toyoura standard sand, following which the mixtures, after being placed into a cylindrical frame 50 mm. in diameter and 100 mm. high, were tamped so as to obtain a porosity of 36%. After allowing the so solidified sands to stand in water for 4 days, the unconfined compressive strength were measured. The results obtained are shown in Table VII.

TABLE VII

| Reference | Amount of the aqueous solution of nonresinous condensation product containing formaldehyde added (part) | Amount of total urea in aqueous solution (wt. percent) | Unconfined compressive strength (kg./cm.$^2$) |
|---|---|---|---|
| 1 | 26.0 | 6.0 | 2.0 |
| 2 | 30.3 | 7.0 | 2.4 |
| 3 | 34.7 | 8.0 | 2.8 |
| 4 | 39.0 | 9.0 | 3.1 |
| 5 | 43.3 | 10.0 | 3.5 |

Figure 3:
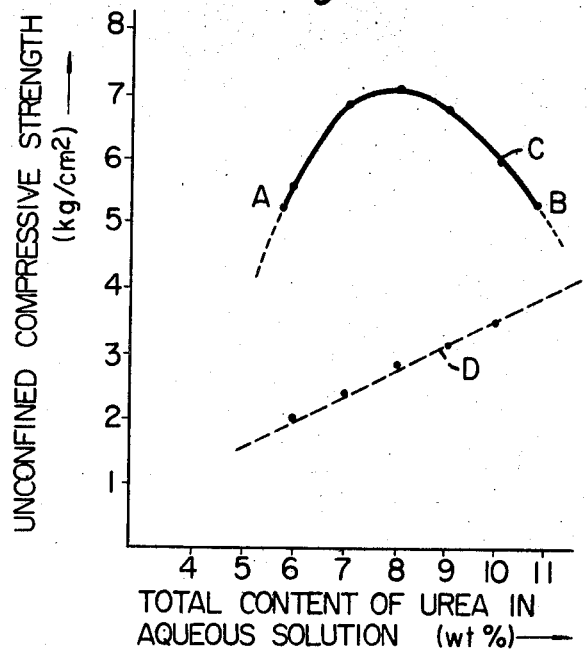
FIG. 3 is a graphic representation similar to FIGURE 1 utilizing the total contents of urea in aqueous solution (wt. percent)

The results obtained in Table VI and VII are as shown in FIG. 3. In FIG. 3 the unconfined compressive strength (kg./cm.$^2$) is indicated along the vertical axis, while the weight percent of the total urea contained in the aqueous solutions is indicated along the horizontal axis, solid line C being the instance in which urea was added and dotted line D being the instance in which urea was not added. The points A and B show the points at which the mole ratios of urea to formaldehyde are respectively 1:1.5 and 1:0.8.

EXAMPLE 31

Ten parts of the aqueous solution of the nonresinous urea-formaldehyde condensation product containing formaldehyde obtained in Examples 16–19, 3 parts of urea and 1 part of partially formalized polyvinyl alcohol (degree of polymerization of 1700, having 72 mol percent of vinyl alcohol, 16 mol percent of vinyl formal and 12 mol percent of vinyl acetate) were dissolved in water and then by further addition of 2 parts of oxalic acid a solution whose total quantity was 102 parts was prepared. This solution was mixed with 250 parts of Toyoura standard sand and the sand was solidified by tamping in a cylindrical frame 50 mm. in diameter and 100 mm. high so that its porosity was 39%. After allowing the so solidified sand to stand in water for 4 days, the unconfined compressive strength and coefficient of permeability were measured. Its unconfined compressive strength was 5.3 kg./cm.$^2$ and the coefficient of permeability was $$2.1 \times 10^{-7}$$

cm./sec.

EXAMPLES 32–36

To 15 parts of the aqueous solution of the nonresinous urea-formaldehyde condensation product containing formaldehyde obtained in Examples 16–19 were added 3.9 parts of urea, 10 parts of a 10 wt. percent aqueous solution of polyvinyl alcohol (degree of polymerization of 2000, having 80 mol percent of vinyl alcohol and 20 mol percent of vinyl acetate) and further water to obtain an aqueous solution in a total quantity of 50 parts. Separately, four classes of aqueous solution of reaction products each in a quantity of 50 parts were obtained by adjusting the hereinabove obtained aqueous solution to a pH of 7.5 and then the reaction thereof was carried out while maintaining a temperature of 50° C., but varying the reaction time.

Using 50 parts each of the aqueous solution and the four classes of aqueous solution of reaction products, as hereinbefore obtained, the experiments were conducted as in Examples 1–5 and measurements of curing time, and unconfined compressive strength and coefficient of permeability of the solidified sands were made. The results obtained are shown in Table VIII.

TABLE VIII

| Example | Reaction time (min.) | Curing time (min.) | Unconfined compressive strength (kg./cm.$^2$) | Coefficient of permeability (cm./sec.) |
|---|---|---|---|---|
| 32 | 0 | 7.3 | 7.2 | 1.3×10$^{-7}$ |
| 33 | 60 | 4.3 | 8.5 | 8.0×10$^{-8}$ |
| 34 | 120 | 3.2 | 10.5 | 6.0×10$^{-8}$ |
| 35 | 180 | 2.7 | 12.6 | 4.1×10$^{-8}$ |
| 36 | 240 | 2.5 | 13.2 | 4.0×10$^{-8}$ |

EXAMPLES 37–38

Fifty parts of an aqueous solution consisting of 6 parts of urea, 9 parts of 37% formalin and 1 part of polyvinyl alcohol (degree of polymerization of 2000, having 80 mol percent of vinyl alcohol and 20 mol percent of vinyl acetate), and also 50 parts of an aqueous solution consisting of 3 parts of urea, 1 part of polyvinyl alcohol (degree of polymerization of 2000, having 80 mol percent of vinyl alcohol and 20 mol percent of vinyl acetate) and 12 parts of the aqueous solution of the nonresinous urea-formaldehyde condensation product containing formaldehyde obtained in Examples 16–19 were prepared.

The quantity of each of these two classes of aqueous solution was adjusted to a total of 103 parts by adding 50 parts of 6 wt. percent aqueous oxalic acid solution to each, after which the viscosity of each was measured at 15° C. and the relationship between the viscosity and time was determined. The results obtained are shown in Table IX.

TABLE IX

| Time (min.) | 0 | 2.5 | 3.5 | 4.0 |
|---|---|---|---|---|
| Example: | | | | |
| 37—Nonresinous condensation product was used (c.p.s.) | 2.3 | 2.3 | 10.5 | |
| 38—Nonresinous condensation product was not used (c.p.s.) | 2.2 | 2.2 | 2.4 | 14.5 |

The results obtained in Table IX are shown in FIG. 4. In FIG. 4 the viscosity (centipoise) is indicated along the vertical axis and the time (minute) is indicated along the horizontal axis. The curve E indicates the results in Example 37, whereas the curve F indicates the results in Example 38.

EXAMPLES 39–44

Aqueous solutions were prepared consisting of 6 parts of urea, 9 parts of 37% formalin and 10 wt. percent aqueous solutions of polyvinyl alcohol (degree of polymerization of 2000, having 80 mol percent of vinyl alchohol and 20 mol percent of vinyl acetate) in the amounts indicated in Table X below, to which water was added to make a total quantity of each to 50 parts.

Separately, aqueous solutions were prepared consisting of 12 parts of the aqueous solution of the nonresinous urea-formaldehyde condensation product containing formaldehyde obtained in Examples 16–19, 3 parts of urea and 10 wt. percent aqueous solution of polyvinyl alcohol (degree of polymerization of 2000, having 80 mol percent of vinyl alcohol and 20 mol percent of vinyl acetate) in the amounts indicated in Table X below, to which water was added to adjust a total quantity of each to 50 parts.

After adding to each of the foregoing solutions 53 parts of 6 wt. percent oxalic acid solution and thereafter mixing with 250 parts of Toyoura standard sand, the mixtures were placed in cylindrical frames 50 mm. in diameter and 100 mm. high and tamped so as to obtain a porosity 39%, followed by allowing to stand for 3 days in wet sand.

Each of the so obtained solidified sand was measured with respect to its coefficient of permeability. The results obtained are shown in Table X.

TABLE X

| Example | Urea and formaldehyde | Aqueous 10 wt. percent polyvinyl alcohol solution (part) | Coefficient of permeability (cm./sec.) |
|---|---|---|---|
| 39 | Urea, 37% formalin | 5 | 2.5×10$^{-6}$ |
| 40 | do | 10 | 5.6×10$^{-7}$ |
| 41 | do | 15 | 8.9×10$^{-8}$ |
| 42 | Nonresinous condensation product containing formaldehyde, urea. | 5 | 7.0×10$^{-7}$ |
| 43 | do | 10 | 1.4×10$^{-7}$ |
| 44 | do | 15 | 4.0×10$^{-8}$ |

We claim:
1. In a process for stabilizing a water-permeable soil in order to render the same substantially water-impermeable, the improvement which comprises injecting into a soil a three component aqueous solution comprising urea, formaldehyde and polyvinyl alcohol, and thereafter curing said aqueous solution with an acidic substance, 100 parts by weight of said aqueous solution containing 1–30 parts by weight of urea, 0.4–22.5 parts by weight of formaldehyde and 0.1–4.0 parts by weight of polyvinyl alcohol, the mole ratio of the urea and formaldehyde being in the range of from 1:0.8 to 1:1.5, and said aqueous solution having a viscosity of 1–15 centipoises.

2. The process according to claim 1 wherein said polyvinyl alcohol has a degree of polymerization of 300–2400, and has a composition of 65–99 mol percent of vinyl alcohol, 0–35 mol percent of vinyl acetal and 1–35 mol percent of vinyl acetate.

3. The process according to claim 1 wherein said aqueous solution is an aqueous solution comprising a mixture of urea, formaldehyde and polyvinyl alcohol.

4. The process according to claim 1 wherein said aqueous solution is an aqueous solution comprising a reaction product obtained by reacting an aqueous solution of a mixture of urea, formaldehyde and polyvinyl alcohol in a pH range of 6 to 11.

5. The process according to claim 4 wherein said polyvinyl alcohol has a degree of polymerization of 300–2400, and has a composition of 65–99 mol percent of vinyl alcohol, 0–35 mol percent of vinyl acetal and 1–35 mol percent of vinyl acetate.

6. The process according to claim 1 wherein said aqueous solution is an aqueous solution of a mixture of urea, polyvinyl alcohol and a non-resinous urea-formaldehyde condensation product containing formaldehyde, in 100 parts by weight of said aqueous solution the total urea content being 1–30 parts by weight and the total formaldehyde content being 0.4–22.5 parts by weight, and the mole ratio of said total urea and total formaldehyde being in the range of from 1:0.8 to 1:1.5.

7. The process according to claim 6 wherein said polyvinyl alcohol has a degree of polymerization of 300–2400, and has a composition of 65–99 mol percent of vinyl alcohol, 0–35 mol percent of vinyl acetal and 1–35 mol percent of vinyl acetate.

8. The process according to claim 6 wherein said non-resinous urea-formaldehyde condensation product containing formaldehyde is obtained by reacting urea and formaldehyde in a proportion of one mole of the former to more than 2 moles of the latter, said non-resinous condensation product containing formaldehyde in an amount of 1.3–16.5 parts by weight per 100 parts by weight of said aqueous solution.

9. The process according to claim 1 wherein said aqueous solution is an aqueous solution comprising a reaction product obtained by reacting an aqueous solution of a mixture of urea, polyvinyl alcohol and a non-resinous urea-formaldehyde condensation product containing formaldehyde in a pH range of 6 to 11, in 100 parts by weight of said aqueous solution of the reaction product the total content of urea being 1–30 parts by weight and the total content of formaldehyde being 0.4–22.5 parts by weight, and the mole ratio of said total urea and total formaldehyde contained being in the range of from 1:0.8 to 1:1.5.

10. The process according to claim 9 wherein said polyvinyl alcohol has a degree of polymerization of 300–2400, and has a compostion of 65–99 mol percent of vinyl alcohol, 0–35 mol percent of vinyl acetal and 1–35 mol percent of vinyl acetate.

11. The process according to claim 9 wherein said non-resinous urea-formaldehyde condensation product containing formaldehyde is obtained by reacting urea and formaldehyde in a proportion of one mole of the former to more than 2 moles of the latter, said non-resinous condensation product containing formaldehyde in an amount of 1.3–16.5 parts by weight per 100 parts by weight of said aqueous solution of the mixture of urea, polyvinyl alcohol and the non-resinous urea-formaldehyde condensation product containing formaldehyde.

References Cited

UNITED STATES PATENTS

| | | | |
|---|---|---|---|
| 2,858,892 | 11/1958 | Carpenter | 61—36 X |
| 2,889,883 | 6/1959 | Santora | 61—36 X |
| 3,208,226 | 9/1965 | Falvey | 61—36 |
| 3,286,475 | 11/1966 | Adams | 61—36 |
| 3,312,070 | 4/1967 | Matsuo et al. | 61—36 |

JACOB SHAPIRO, Primary Examiner

U.S. Cl. X.R.

61—1; 166—295, 300